United States Patent
Matsunami (10) Patent No.: US 10,657,358 B2
(45) Date of Patent: May 19, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 16/025,486

(22) Filed: Jul. 2, 2018

(65) Prior Publication Data
US 2019/0034697 A1    Jan. 31, 2019

(30) Foreign Application Priority Data
Jul. 25, 2017    (JP) ................ 2017-143453

(51) Int. Cl.
*G06T 9/00* (2006.01)
*G06K 9/00* (2006.01)
*G06T 3/40* (2006.01)

(52) U.S. Cl.
CPC ....... *G06K 9/00087* (2013.01); *G06K 9/0008* (2013.01); *G06K 9/00026* (2013.01); *G06K 9/00067* (2013.01); *G06T 3/40* (2013.01)

(58) Field of Classification Search
CPC combination set(s) only.
See application file for complete search history.

(56) References Cited

U.S. PATENT DOCUMENTS

| | | | |
|---|---|---|---|
| 2009/0074263 A1 | 3/2009 | Higuchi | |
| 2017/0124379 A1* | 5/2017 | Zhang | ............... G06K 9/6272 |
| 2018/0253626 A1* | 9/2018 | Lin | ............... G06K 9/00577 |

FOREIGN PATENT DOCUMENTS

| | | |
|---|---|---|
| JP | 2005-025414 | 1/2005 |
| JP | 2006-158952 | 6/2006 |
| JP | 2009-064262 | 3/2009 |
| JP | 2013-225324 | 10/2013 |

* cited by examiner

*Primary Examiner* — Leon Viet Q Nguyen
(74) *Attorney, Agent, or Firm* — Fujitsu Patent Center (57) ABSTRACT

An information processing apparatus includes a memory configured to store first information of a first fingerprint image, and a processor coupled to the memory and configured to obtain second information of a second fingerprint image, generate third information of a third fingerprint image by enlarging or reducing the second fingerprint image, specify an enlargement rate or a reduction rate based on a first similarity between the second information and the first information and a second similarity between the third information and the first information, and execute a first matching process of the first information and fourth information of a fourth fingerprint image, the fourth fingerprint image being generated by enlarging or reducing the first fingerprint image by the enlargement rate or the reduction rate.

20 Claims, 10 Drawing Sheets

WHORL TYPE FINGERPRINT

FLOW TYPE FINGERPRINT

WAVE TYPE FINGERPRINT

SLIDING DIRECTION

FIG. 7B 1.1 TIMES

FIG. 7C 0.9 TIME

|  | WHORL TYPE FINGERPRINT | FLOW TYPE FINGERPRINT | WAVE TYPE FINGERPRINT |
| --- | --- | --- | --- |
| EXPANSION OR CONTRACTION PARAMETER p | 0.15 | 0.2 | 0.1 |

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-143453, filed on Jul. 25, 2017, the entire contents of which are incorporated herein by reference.

FIELD

The embodiments discussed herein are related to an information processing apparatus, a method and a non-transitory computer-readable storage medium.

BACKGROUND

An individual authentication device is known which is provided with an imaging unit that captures an image produced by light transmitted through a finger and an image processing unit that processes the image captured by the imaging unit. The image processing unit extracts fingerprint information and vein information from the image, corrects the vein information based on the fingerprint information, and carries out authentication of an individual using the corrected vein information. The image processing unit corrects at least either the rotation angle or the magnification of the vein information based on the fingerprint information.

Also, an image correction device is known in which when a finger is swept on a fingerprint sensor with an inclination, the inclination of a fingerprint image produced by combining partial fingerprint image data obtained by the fingerprint sensor is corrected. The image correction device includes a combination memory, in which the partial fingerprint image data are recorded and stored in sequence to form a fingerprint image, and an image inclination correction mechanism that corrects the inclination of the fingerprint image formed in the combination memory in accordance with the inclination angle at the time of sweeping the finger.

Also, a biometric feature input device is known which includes a one-dimensional or quasi-one-dimensional image sensor, a finger travelling guide, and an image processing mechanism. The finger travelling guide causes a finger to substantially keep a certain distance from an effective pixel section of the image sensor without touching during a relative movement in which a finger and the image sensor are slid with each other. The image processing mechanism generates an image originated from radiation light radiated from the skin surface of the finger caused by diffusion inside the finger by combining one-dimensional or quasi-one-dimensional partial images obtained during the relative movement. Related-art techniques are disclosed in Japanese Laid-open Patent Publication No. 2013-225324, Japanese Laid-open Patent Publication No. 2009-64262, Japanese Laid-open Patent Publication No. 2006-158952, and Japanese Laid-open Patent Publication No. 2005-25414.

SUMMARY

According to an aspect of the invention, an information processing apparatus includes a memory configured to store first information of a first fingerprint image, and a processor coupled to the memory and configured to obtain second information of a second fingerprint image, generate third information of a third fingerprint image by enlarging or reducing the second fingerprint image, specify an enlargement rate or a reduction rate based on a first similarity between the second information and the first information and a second similarity between the third information and the first information, and execute a first matching process of the first fingerprint image and fourth information of a fourth fingerprint image, the fourth fingerprint image being generated by enlarging or reducing the first fingerprint image by the enlargement rate or the reduction rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

There are two types of sensors, a surface type sensor and a slide type sensor, for capturing a fingerprint image. With a surface type sensor, a finger is pressed against a fingerprint acquisition area so that a touched area in an image acquisition area is directly obtained as an image. On the other hand, with a slide type sensor, a finger is slid while the finger is being put on a rectangular image acquisition area that is shorter than the length of a fingerprint so that a plurality of partial images are obtained, and one fingerprint image is obtained by combining the partial images.

With a slide type sensor, a fingerprint image is expanded or contracted in the sliding direction in accordance with the speed of sliding a finger. Accordingly, when a registration fingerprint image is obtained by a surface type sensor, and a matching image is obtained by a slide type sensor, a deformation occurs only in the matching fingerprint image, and thus a false rejection is likely to occur. Accordingly, a technique for correcting the expansion or the contraction from a fingerprint image obtained by a slide type sensor is desired.

As a correcting method of the expansion or the contraction, it is thought that variations are provided for the deformations of a registration image and matching data. However, if registration data is provided with variations, a large number of templates are held, and thus the hardware cost increases. If matching data is provided with variations, deformation processing is included each time matching is performed, and thus the calculation cost increases.

First Embodiment

Figure 1A:
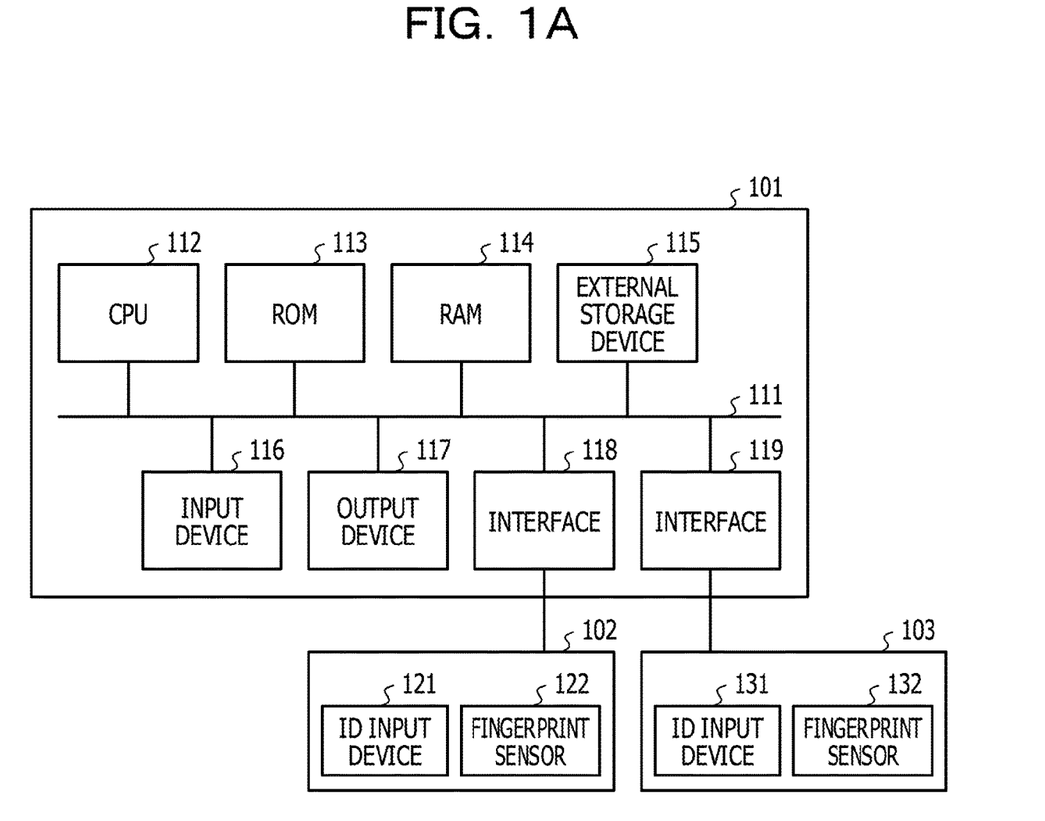
FIG. 1A is a diagram illustrating an example of the configuration of a biometric image processing system according to a first embodiment.

FIG. 1A is a diagram illustrating an example of the configuration of a biometric image processing system according to a first embodiment. The biometric image processing system includes a biometric image processing apparatus 101, an input device 102, and an input device 103. The biometric image processing apparatus 101 is a computer and includes a bus 111, a central processing unit (CPU) 112, a read only memory (ROM) 113, a random access memory (RAM) 114, an external storage device 115, an input device 116, an output device 117, an interface 118, and an interface 119.

The ROM 113 stores a start program. The CPU 112 executes the start program stored in the ROM 113 so as to start the biometric image processing apparatus 101. The external storage device 115 is, for example, a hard disk drive and stores a biometric image processing program. The CPU 112 loads the biometric image processing program stored in the external storage device 115 into the RAM 114 and executes the biometric image processing program so as to perform the biometric image processing in FIG. 2 and FIG. 3 described later. The input device 116 is, for example, a keyboard, a mouse, and the like and is capable of making various specifications, inputting, or the like. The output device 117 is a display, a printer, or the like. The interface 118 is coupled to the input device 102. The interface 119 is coupled to the input device 103.

The input device 102 includes an identifier (ID) input device 121 and a fingerprint sensor 122. The input device 103 includes an identifier input device 131 and a fingerprint sensor 132. The identifier input devices 121 and 131 inputs an identifier using the keyboard or a card reader. The fingerprint sensors 122 and 132 capture a fingerprint of a finger of a living body by an image sensor so as to generate a fingerprint image.

Figure 1B:
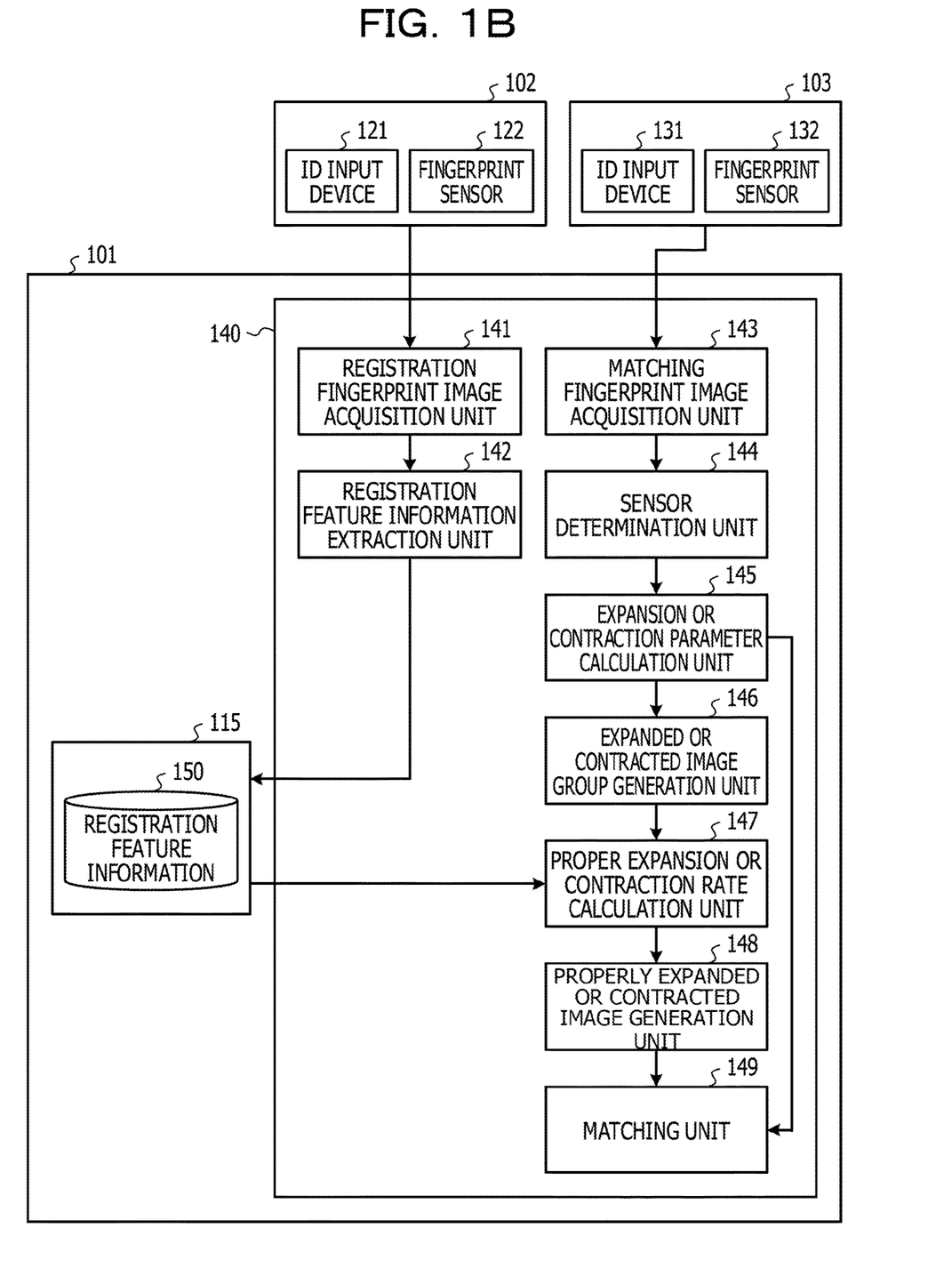
FIG. 1B is a diagram illustrating an example of the functional configuration of the biometric image processing system according to the first embodiment.

FIG. 1B is a diagram illustrating an example of the functional configuration of the biometric image processing system according to the present embodiment. The biometric image processing system includes the biometric image processing apparatus 101, the input device 102, and the input device 103. The biometric image processing apparatus 101 includes a program module 140 and the external storage device 115. The program module 140 is a module of the biometric image processing program executed by the CPU 112. The program module 140 includes a registration fingerprint image acquisition unit 141, a registration feature information extraction unit 142, a matching fingerprint image acquisition unit 143, a sensor determination section 144, an expansion or contraction parameter calculation unit 145, an expanded or contracted image group generation unit 146, a proper expansion or contraction rate calculation unit 147, a properly expanded or contracted image generation unit 148, and a matching unit 149. The external storage device 115 stores registration feature information 150.

The input devices 102 and 103 are disposed at different places with each other. For example, the input device 102 is disposed at a near place from the biometric image processing apparatus 101, and the input device 103 is disposed at a distant place from biometric image processing apparatus 101.

The fingerprint sensors 122 and 132 are fingerprint sensors of different types with each other. The fingerprint sensor 122 is a surface-type fingerprint sensor that generates a fingerprint image without sliding an image sensor against a fingerprint. The surface-type fingerprint sensor 122 includes a two-dimensional image sensor. With the surface-type fingerprint sensor 122, when a finger is pressed on a fingerprint acquisition area, the two-dimensional image sensor captures a two-dimensional image of the fingerprint of the finger and generates a two-dimensional fingerprint image.

The fingerprint sensor 132 is a slide-type fingerprint sensor that generates a fingerprint image while the image sensor is being relatively slid against a fingerprint. The slide-type fingerprint sensor 132 includes one or a plurality of one-dimensional image sensors. When a finger is slid while the finger is put on a rectangular one-dimensional image sensor surface that is shorter than the length of the fingerprint of the finger, a plurality of partial images are consecutively captured. The slide-type fingerprint sensor 132 combines the plurality of partial images so as to generate one two-dimensional fingerprint image.

The biometric image processing apparatus 101 matches a fingerprint image generated by the fingerprint sensor 122 with a fingerprint image generated by the fingerprint sensor 132 so as to perform fingerprint authentication. The slide-type fingerprint sensor 132 has an advantage in that it is smaller sized compared with the surface-type fingerprint sensor 122. However, a fingerprint image generated is expanded or contracted in the slide direction by the speed of moving a finger and the strength of pressing the finger. Accordingly, there is a problem with the biometric image processing apparatus 101 in that the fingerprint authentication precision deteriorates. A fingerprint image generated by the surface-type fingerprint sensor 122 is not expanded or contracted, but a fingerprint image generated by the slide-type fingerprint sensor 132 is expanded or contracted. Accordingly, if the biometric image processing apparatus 101 matches the information of a fingerprint image generated by the surface-type fingerprint sensor 122 with the information of a fingerprint image generated by the slide-type fingerprint sensor 132, a fingerprint authentication failure is likely to occur even for a same person. As a result, it is not possible to keep the compatibility between the surface-type fingerprint sensor 122 and the slide-type fingerprint sensor 132, and thus it is not possible for a user to use fingerprint sensors separately depending on applications. Accordingly, the usability deteriorates. Thus, the biometric image processing apparatus 101 corrects the expansion or contraction of a fingerprint image generated by the slide-type fingerprint sensor 132 so as to maintain the compatibility of the fingerprint sensors.

Figure 2:
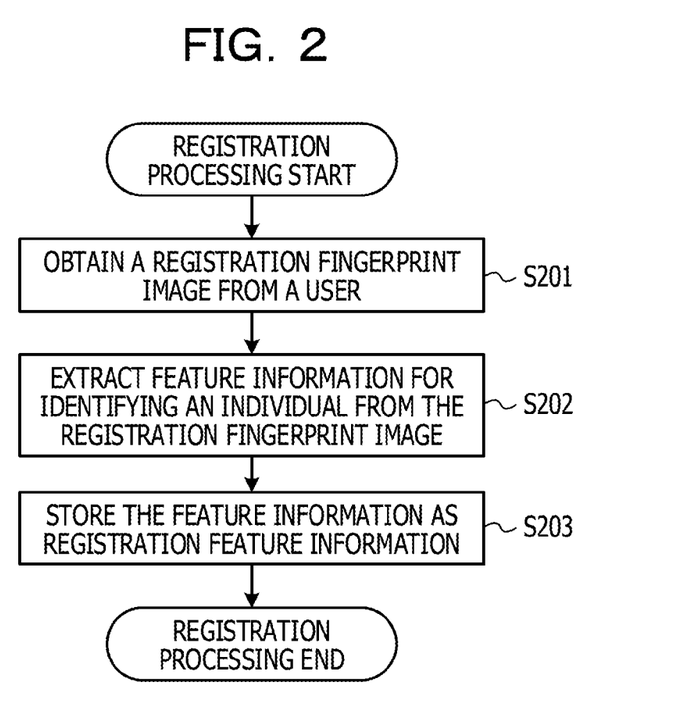
FIG. 2 is a flowchart illustrating a registration processing method of a biometric image processing apparatus.

FIG. 2 is a flowchart illustrating a biometric image processing method (registration processing method) of the biometric image processing apparatus 101. A user inputs an identifier and a fingerprint of a finger by the input device 102 for fingerprint registration. The identifier input device 121 inputs an identifier of the user by the keyboard or the card reader. An identifier is an identification number or an identification code. The surface-type fingerprint sensor 122 generates a fingerprint image without sliding an image sensor against a fingerprint. The registration fingerprint image acquisition unit 141 and the registration feature information extraction unit 142 are registration units.

In step S201, the CPU 112 obtains, by the registration fingerprint image acquisition unit 141, the identifier input by the identifier input device 121, the fingerprint image (registration fingerprint image) generated by the fingerprint sensor 122, and the type (model number) of the fingerprint sensor 122. The type of the fingerprint sensor indicates either the surface-type fingerprint sensor or the slide-type fingerprint sensor. Next, in step S202, the CPU 112 obtains feature information from the obtained fingerprint image by the registration feature information extraction unit 142. The feature information is, for example, an image feature, such as the frequency information of a fingerprint image, or the like, or relation information of minutia (fingerprint feature point), or the like, and is indicated by a feature vector of real numbers. Next, in step S203, the CPU 112 registers the feature information in the external storage device 115 by the registration feature information extraction unit 142 as the registration feature information 150 in association with the obtained identifier and the type (model number) of the fingerprint sensor 122.

In this regard, the user may input a fingerprint into the fingerprint sensor 122 for a plurality of times. In that case, in step S201, the CPU 112 obtains a plurality of fingerprint images by the registration fingerprint image acquisition unit 141. Next, in step S202, the CPU 112 extracts a plurality pieces of feature information from the plurality of fingerprint images by the registration feature information extraction unit 142 respectively and generates feature information by combining the plurality of feature information. Next, in step S203, the CPU 112 registers the combined feature information in the external storage device 115 by the registration feature information extraction unit 142 as the registration feature information 150.

Figure 3:
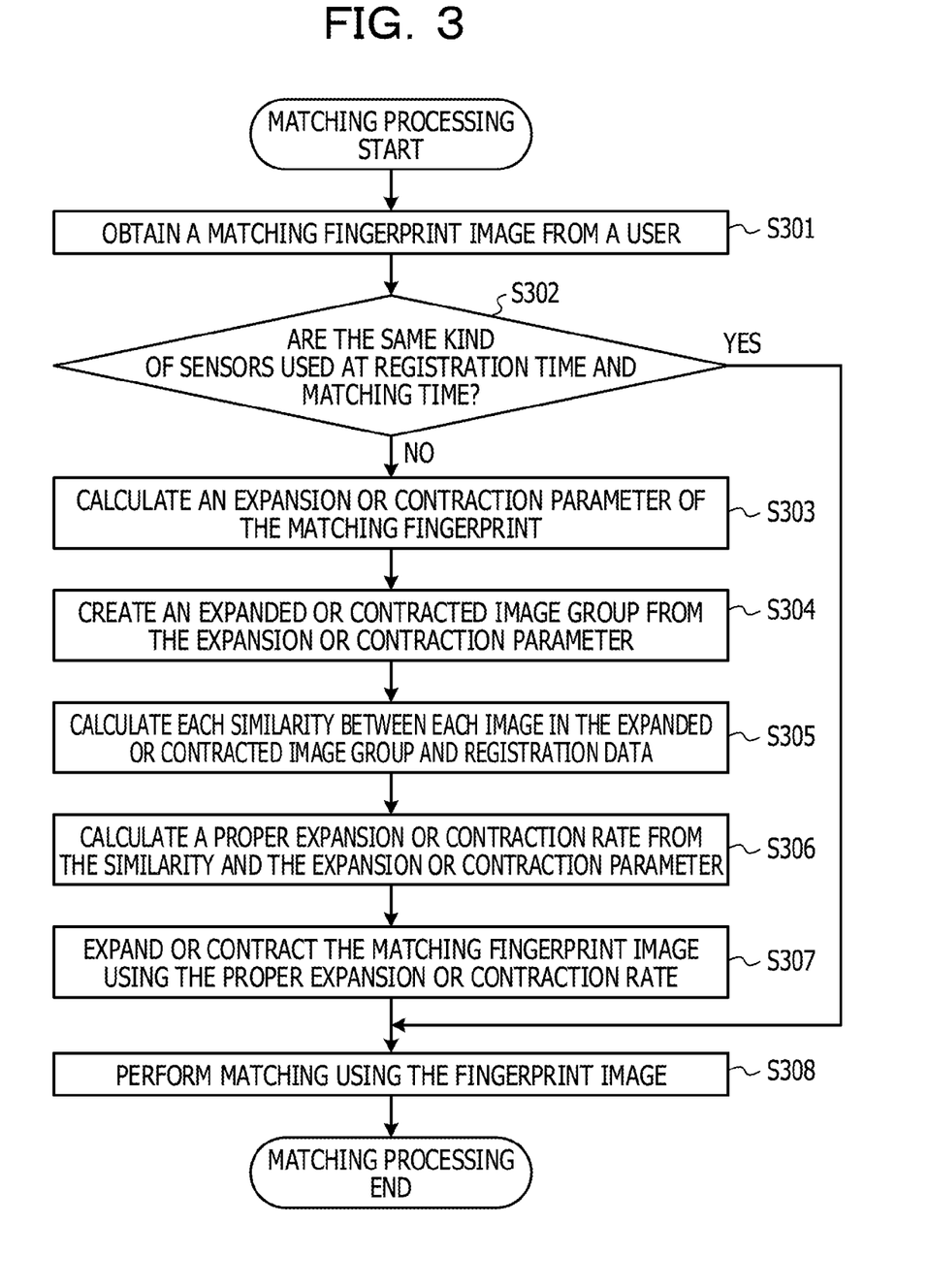
FIG. 3 is a flowchart illustrating a matching processing method of the biometric image processing apparatus.

FIG. 3 is a flowchart illustrating a biometric image processing method (matching processing method) of the biometric image processing apparatus 101. The user inputs an identifier and the fingerprint of a finger by the input device 103 for fingerprint matching (fingerprint authentication). The identifier input device 131 inputs the identifier of the user by the keyboard or the card reader. An identifier is an identification number or an identification code. The slide-type fingerprint sensor 132 generates a fingerprint image while the image sensor is being relatively slid against the fingerprint. Specifically, the slide-type fingerprint sensor 132 generates one fingerprint image by combining a plurality of partial images that have been consecutively captured.

The fingerprint image generated by the surface-type fingerprint sensor 122 has the same aspect ratio as that of the fingerprint of a finger. However, in the fingerprint image generated by the slide-type fingerprint sensor 132, an expansion or a contraction occurs in the vertical direction, and thus the generated fingerprint image has a different aspect ratio from that of the fingerprint of a finger. Thereby, the difference in the feature information extracted from the fingerprint images of the surface-type fingerprint sensor 122 and the slide-type fingerprint sensor 132 increases, and there is a risk that the biometric image processing apparatus 101 fails in performing correct fingerprint authentication. Thus, the biometric image processing apparatus 101 corrects the expansion or contraction of the fingerprint image generated by the slide-type fingerprint sensor 132 in the vertical direction so as to make its aspect ratio equal to the aspect ratio of the fingerprint image generated by the surface-type fingerprint sensor 122. The CPU 112 estimates the proper expansion or contraction rate in the vertical direction of the fingerprint image generated by the slide-type fingerprint sensor 132 by the proper expansion or contraction rate calculation unit 147.

In step S301, by the matching fingerprint image acquisition unit 143, the CPU 112 obtains the identifier input by the identifier input device 131, the fingerprint image (matching fingerprint image) generated by the fingerprint sensor 132, and the type (model number) of the fingerprint sensor 132. The type of the fingerprint sensor indicates either the surface-type fingerprint sensor or the slide-type fingerprint sensor.

Next, in step S302, by the sensor determination section 144, the CPU 112 determines whether or not the type of the fingerprint sensor 122 registered in the external storage device 115 corresponding to the identifier obtained in step S301 is the same as the type of the fingerprint sensor 132 obtained in step S301.

If the CPU 112 determines that the fingerprint sensors 122 and 132 are of the same type by the sensor determination section 144, the CPU 112 determines that there is no or a little difference in the expansion or contraction in the vertical direction between the fingerprint image of the fingerprint sensor 122 and the fingerprint image of the fingerprint sensor 132, and the processing proceeds to step S308. Specifically, if the CPU 112 determines that the fingerprint sensors 122 and 132 are both the surface-type fingerprint sensors by the sensor determination section 144, or that the fingerprint sensors 122 and 132 are both the slide-type fingerprint sensors, the processing proceeds to step S308. In that case, in step S308, the CPU 112 extracts feature information from the fingerprint image obtained in step S301 by the matching unit 149, and performs matching the extracted feature information with the registration feature information 150 registered in the external storage device 115, which corresponds to the identifier obtained in step S301 so as to calculate a matching score. The matching score is, for example, a similarity. If the matching score is equal to or higher than a threshold value, the CPU 112 determines it to be a fingerprint authentication success by the matching unit 149 and performs displaying and processing of the fingerprint authentication success. If the matching score is less than the threshold value, the CPU 112 determines it to be a fingerprint authentication failure and performs displaying and processing of the fingerprint authentication failure.

If the CPU 112 determines that the fingerprint sensors 122 and 132 are not of the same type by the sensor determination section 144, the CPU 112 determines that the difference in the expansion or contraction in the vertical direction between the fingerprint image of the fingerprint sensor 122 and the fingerprint image of the fingerprint sensor 132 is large, and the processing proceeds to step S303. Specifically, if the CPU 112 determines that both of the fingerprint sensors 122 and 132 are not the surface-type fingerprint sensor, and both of the fingerprint sensors 122 and 132 are not the slide-type fingerprint sensor by the sensor determination section 144, the processing proceeds to step S303. That is to say, if the CPU 112 determines that one of the fingerprint sensors 122 and 132 is the surface-type fingerprint sensor by the sensor determination section 144, and the other of the sensors is the slide-type fingerprint sensor, the processing proceeds to step S303.

Here, a description will be given of the generation mechanism of expansion and contraction of a fingerprint image in the vertical direction, which is generated by the slide-type fingerprint sensor 132. The slide-type fingerprint sensor 132 combines a plurality of partial images to generate one fingerprint image captured while sliding the plurality of partial images. At this time, an overlapping area is included in adjacent partial images with each other, and if an error occurs in the overlapping area determination of the slide-type fingerprint sensor 132, an expansion or a contraction of the fingerprint image occurs in the vertical direction. That is to say, if the slide-type fingerprint sensor 132 mistakenly determines the overlapping area to be larger than the original size, the fingerprint image is contracted in the vertical direction. If the slide-type fingerprint sensor 132 mistakenly determines the overlapping area to be smaller than the original size, the fingerprint image is expanded in the vertical direction. The smaller the change of the fingerprint ridge in the vertical direction, the larger the error in the overlapping area determination of the adjacent partial images tends to become, and thus the fingerprint image is likely to be expanded or contracted.

Figure 4A:
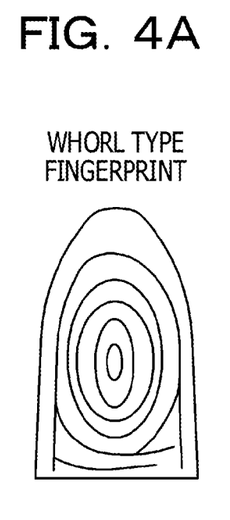
FIGS. 4A, 4B, and 4C are diagrams illustrating types of fingerprint images generated by a slide-type fingerprint sensor.
Figure 4B:
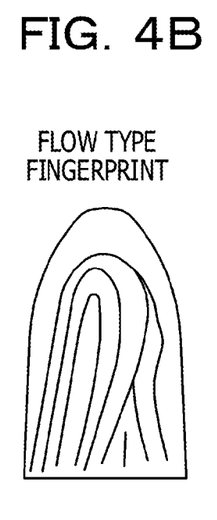
Figure 4C:
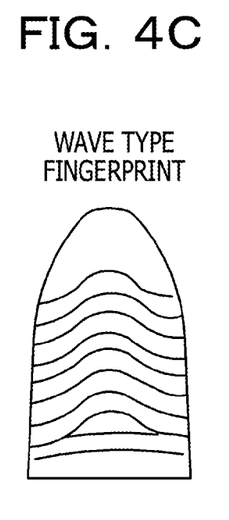

FIGS. 4A to 4C are diagrams illustrating types of fingerprint images generated by the slide-type fingerprint sensor 132. The sliding direction at the time of sliding a finger against the slide-type fingerprint sensor 132 is the vertical direction (direction connecting a fingertip and the base of the finger) in FIGS. 4A to 4C. The biometric image processing apparatus 101 corrects the expansion and contraction of the fingerprint image in the vertical direction in FIG. 4A to 4C. FIG. 4A illustrates a whorl type fingerprint. FIG. 4B illustrates a flow type fingerprint. FIG. 4C illustrates a wave type fingerprint. The whorl type fingerprint in FIG. 4A and the flow type fingerprint in FIG. 4B are fingerprints in which changes of the fingerprint ridge in the vertical direction are small, and thus errors in the overlapping area determination of adjacent partial images are likely to become large. Accordingly, the fingerprint image tends to be expanded or contracted. The wave type fingerprint in FIG. 4C is a fingerprint having large changes of the fingerprint ridges in the vertical direction, and thus errors in the overlapping area determination of adjacent partial images are small. Accordingly, the fingerprint image is unlikely to be expanded or contracted.

Figure 5A:
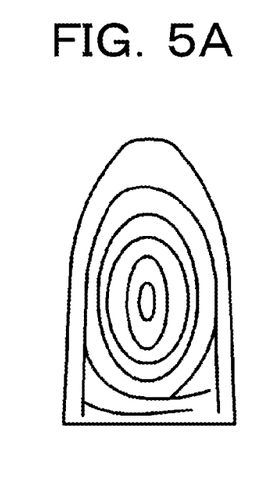
FIGS. 5A, 5B, 5C, 5D, and 5E are diagrams for explaining fingerprint images of whorl type fingerprints generated by the slide-type fingerprint sensor.
Figure 5B:
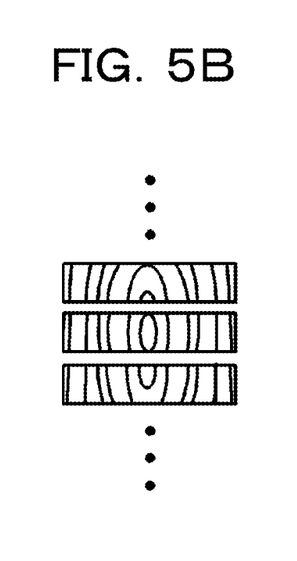
Figure 5C:
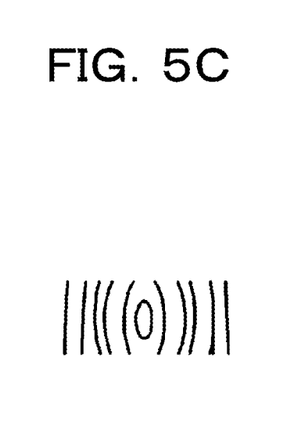
Figure 5D:
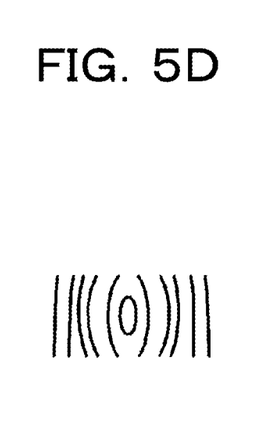
Figure 5E:
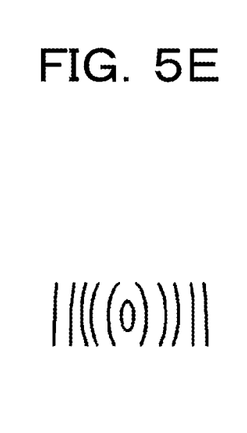

FIGS. 5A to 5E are diagrams for explaining fingerprint images of whorl type fingerprints generated by the slide-type fingerprint sensor 132. FIG. 5A is a diagram illustrating a whorl type fingerprint of a finger. FIG. 5B illustrates a diagram illustrating a plurality of partial images generated by the slide-type fingerprint sensor 132. FIGS. 5C to 5E are diagrams illustrating fingerprint images produced by combining the plurality of partial images in FIG. 5B. FIG. 5C is a fingerprint image having the same expansion or contraction rate in the vertical direction as the fingerprint of the finger in FIG. 5A. FIG. 5D is a fingerprint image produced by expanding the fingerprint of the finger in FIG. 5A in the vertical direction. FIG. 5E is a fingerprint image produced by contracting the fingerprint of the finger in FIG. 5A in the vertical direction.

Figure 6A:
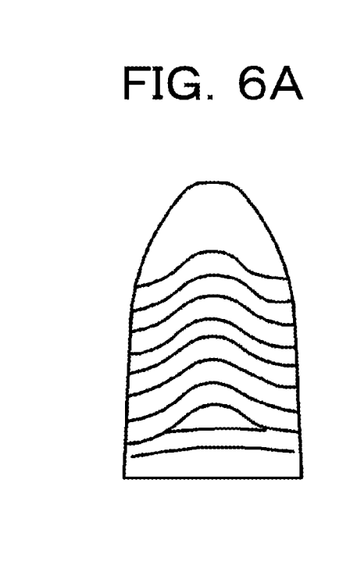
FIGS. 6A, 6B, 6C, 6D, and 6E are diagrams for explaining fingerprint images of wave type fingerprints generated by the slide-type fingerprint sensor.
Figure 6B:
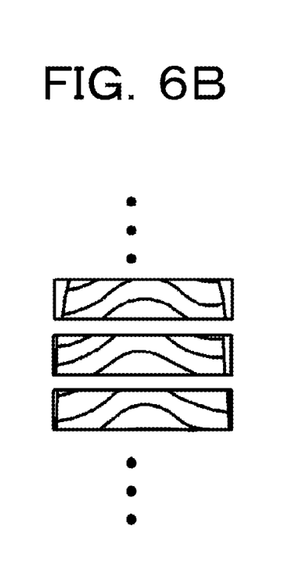
Figure 6C:
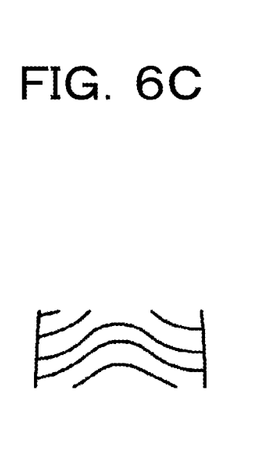
Figure 6D:
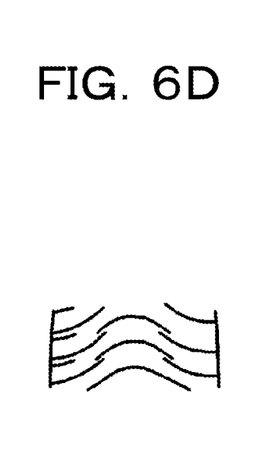
Figure 6E:
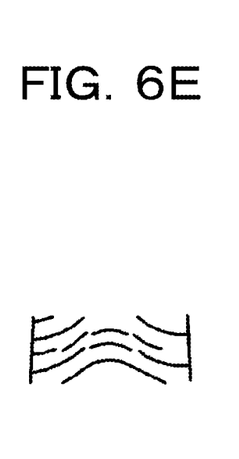

FIGS. 6A to 6E are diagrams for explaining fingerprint images of wave type fingerprints generated by the slide-type fingerprint sensor 132. FIG. 6A is a diagram illustrating a wave type fingerprint of a finger. FIG. 6B is a diagram illustrating a plurality of partial images generated by the slide-type fingerprint sensor 132. FIGS. 6C to 6E are diagrams illustrating fingerprint images produced by combining the plurality of partial images in FIG. 6B. FIG. 6C is a fingerprint image having the same expansion or contraction rate in the vertical direction as that of the fingerprint of the finger in FIG. 6A. FIG. 6D is a fingerprint image produced by expanding in the vertical direction the fingerprint of the finger in FIG. 6A. FIG. 6E is a fingerprint image produced by contracting the fingerprint of the finger in FIG. 6A in the vertical direction.

The whorl type fingerprints in FIGS. 5A to 5E have a small change in the ridges in the vertical direction. Both the fingerprint image expanded in the vertical direction in FIG. 5D and the fingerprint image contracted in the vertical direction in FIG. 5E have continuous ridges, and thus are determined as proper fingerprint images. As a result, although the fingerprint image in FIG. 5C is originally correct, there is a possibility that the slide-type fingerprint sensor 132 will mistakenly determine that the fingerprint images in FIG. 5D and FIG. 5E are correct. Accordingly, an expansion or a contraction in the vertical direction is likely to occur in the fingerprint images of the whorl type in FIGS. 5A to 5E.

The wave type fingerprints in FIGS. 6A to 6E have large changes in the ridges in the vertical direction. The fingerprint image in FIG. 6C has continuous ridges, and thus is determined as a proper fingerprint image. In contrast, the fingerprint image expanded in the vertical direction in FIG. 6D and the fingerprint image contracted in the vertical direction in FIG. 6E have discontinuous ridges, and thus it is easy for the slide-type fingerprint sensor 132 to determine as improper fingerprint images, and thus an expansion or a contraction in the vertical direction is unlikely to occur.

In step S303, the CPU 112 calculates a vertical direction degree of change indicating the size of the horizontal component of fingerprint ridges by the expansion or contraction parameter calculation unit 145 in order to estimate a proper expansion or contraction rate. For example, the CPU 112 calculates a correlation coefficient c between the fingerprint image obtained in step S301 and the fingerprint image produced by shifting the fingerprint image by n pixels in the vertical direction, and calculates a vertical direction degree of change $d=1-c$ between the fingerprint image obtained in step S301 and the fingerprint image produced by shifting the fingerprint image by n pixels in the vertical direction. The range of the vertical direction degree of change d is $0 \leq d \leq 1$. As illustrated in FIG. 6A, the larger the horizontal component of the fingerprint ridge, the larger the vertical direction degree of change d becomes. Next, the CPU 112 calculates an expansion or contraction parameter p by the expansion or contraction parameter calculation unit 145 based on the vertical direction degree of change d. The smaller the vertical direction degree of change d, the more likely an expansion or a contraction of the fingerprint image in the vertical direction occurs, and thus the CPU 112 calculates an expansion or contraction parameter $p=B \cdot (1-d)^n$. The smaller the vertical direction degree of change d, the larger value the expansion or contraction parameter p becomes, and its maximum value is B. B is a positive real number, and n is a positive integer. For example, the biometric image processing apparatus 101 calculates a maximum value of the expansion or contraction degree in the vertical direction of the fingerprint image generated by the slide-type fingerprint sensor 132 in advance, and determines B and n such that its maximum value matches the maximum value of the expansion or contraction parameter p. Here, the expansion or contraction degree indicates the ratio of the vertical direction length of a fingerprint image to the vertical direction length of the fingerprint of a finger. When the expansion or contraction rate is 1.2 times, the expansion or contraction degree is 0.2, and when the expansion or contraction rate is 0.9 time, the expansion or contraction degree is 0.1.

Next, in step S304, the CPU 112 generates an expanded or contracted fingerprint image produced by expanding or contracting the fingerprint image obtained in step S301, by the expanded or contracted image group generation unit 146, using the expansion or contraction rate based on the expansion or contraction parameter p to obtain an expanded or contracted image group. Specifically, the CPU 112 generates the fingerprint image expanded in the vertical direction and/or the fingerprint image contracted in the vertical direction from the fingerprint image obtained in step S301 using the expansion or contraction rate based on the expansion or contraction parameter p. The CPU 112 may generate both an expanded fingerprint image and a contracted fingerprint image or either one of the images. For example, if it is confirmed that the fingerprint image generated by the slide-type fingerprint sensor 132 is contracted in the vertical direction, the CPU 112 generates only the contracted fingerprint image. In the following example, a description will be given of the case where the CPU 112 generates both the expanded fingerprint image and the contracted fingerprint image. The CPU 112 obtains the expanded or contracted image group of (1+2k) pieces, which include one fingerprint image obtained in step S301, k expanded fingerprint images produced by expanding the fingerprint image in the vertical direction, and k contracted fingerprint images produced by contracting the fingerprint image in the vertical direction.

For example, if k=1, the expanded fingerprint image is (1+p) times the fingerprint image in the vertical direction, and the contracted fingerprint image is (1−p) times the fingerprint image in the image vertical direction. Also, if k≥2, the expanded fingerprint images are k images having different m, which are (1+m·p) times (0<m≤1) the fingerprint image in the vertical direction respectively, and the contracted fingerprint images are k images having different m, which are (1−m·p) times (0<m≤1) the fingerprint image in the vertical direction.

Figure 7A:
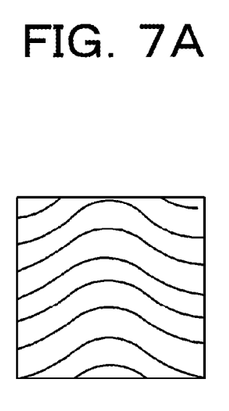
FIGS. 7A, 7B, and 7C are diagrams illustrating examples in an expanded or contracted image group.
Figure 7B:
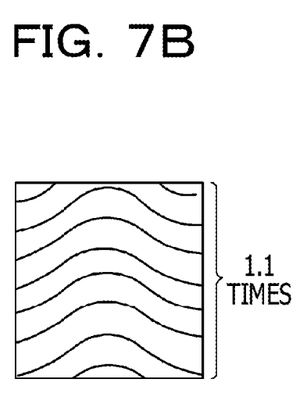
Figure 7C:
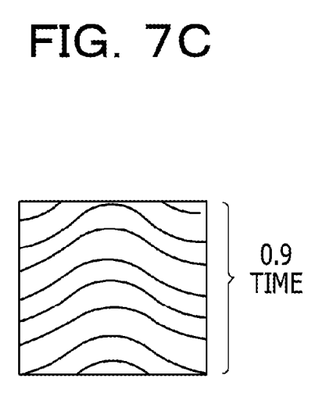

FIGS. 7A to 7C are diagrams illustrating examples in an expanded or contracted image group when k=1. The expanded or contracted image group includes the fingerprint image in FIG. 7A, the expanded fingerprint image in FIG. 7B, and the contracted fingerprint image in FIG. 7C. FIG. 7A is the fingerprint image obtained in step S301. FIG. 7B is an expanded fingerprint image, which is 1.1 times the fingerprint image in FIG. 7A in the vertical direction. FIG. 7C is a contracted fingerprint image, which is 0.9 time the fingerprint image in FIG. 7A in the vertical direction.

Next, in step S305, the CPU 112 extracts the expanded or contracted image group including (1+2k) pieces of feature information respectively by the proper expansion or contraction rate calculation unit 147. The CPU 112 then calculates, by the proper expansion or contraction rate calculation unit 147, respective similarities Sim(sc) of the (1+2k) pieces of feature information of the expanded or contracted image group to the registration feature information 150 registered in the external storage device 115, which correspond to the identifier obtained in step S301. The sign sc is the expansion or contraction rate of the fingerprint image. The fingerprint image in FIG. 7A has an expansion or contraction rate sc of 1. The expanded fingerprint image in FIG. 7B has an expansion or contraction rate sc of 1.1 (=1+m·p). The contracted fingerprint image in FIG. 7C has an expansion or contraction rate sc of 0.9 (=1−m·p). For example, if the feature information is expressed by a feature vector, the similarity Sim(sc) is the reciprocal of the distance between the feature vectors with each other. The CPU 112 obtains (1+2k) similarities Sim(sc).

Next, in step S306, the CPU 112 calculates, by the proper expansion rate calculation unit 147, an expansion or contraction rate that provides the maximum similarity Sim (sc_max) as a proper expansion rate based on the pairs of the (1+2k) expansion or contraction rate sc and the similarity Sim(sc). Specifically, the CPU 112 calculates an expansion or contraction rate sc_max that provides the maximum similarity Sim(sc_max) as a proper expansion rate based on the expansion or contraction rate sc (=1) and the similarity Sim(sc) of the fingerprint image in FIG. 7A, the expansion or contraction rate sc (=1.1) and the similarity Sim(sc) of the expanded fingerprint image in FIG. 7B, and the expansion or contraction rate sc (=0.9) and the similarity Sim(sc) of the contracted fingerprint image in FIG. 7C. For example, the CPU 112 applies the similarity Sim(sc) to a function having the local maximum value and estimates the expansion or contraction rate sc_max that provides the local maximum value Sim(sc_max). The example of a function having a local maximum value is a second or higher order polynomial function, a Gaussian function, or the like. The example of application is the least squares method, a spline interpolation, or the like.

Figure 8:
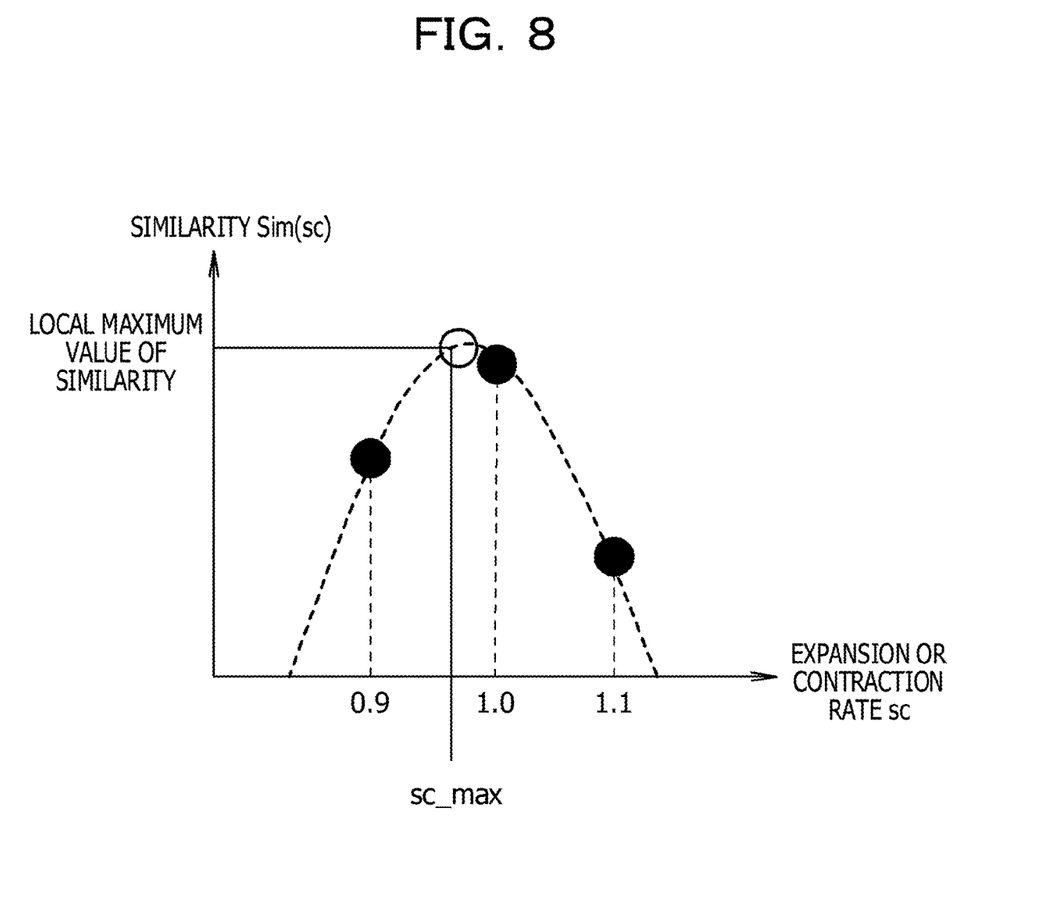
FIG. 8 is a diagram illustrating an example of applying similarity to a secondary polynomial by the least squares method.

FIG. 8 is a diagram illustrating an example of applying a similarity Sim(sc) to a secondary polynomial by the least squares method using the expanded or contracted image group in FIGS. 7A to 7C. The three black circles indicate the similarities when the expansion or contraction rate is 0.9, 1.0, and 1.1 respectively. The CPU 112 estimate a reasonable secondary curve that passes through the three black circles by the least squares method and calculates an expansion or contraction rate sc_max that gives a local maximum value Sim(sc_max) of the similarity of the secondary curve as a proper expansion rate.

Next, in step S307, the CPU 112 generates, by the properly expanded or contracted image generation unit 148, a properly expanded or contracted image produced by expanding or contracting the fingerprint image obtained in step S301 in the vertical direction using the proper expansion rate sc_max.

Next, in step S308, the CPU 112 extracts feature information from the properly expanded or contracted image by the matching unit 149. The CPU 112 then matches, by the matching unit 149, the feature information of the properly expanded or contracted image with the registration feature information 150 registered in the external storage device 115, which is associated with the identifier obtained in step S301, and calculates a matching score. The matching score is, for example, the similarity used in step S306. If the matching score is equal to or higher than a threshold value, the CPU 112 determines as a fingerprint authentication success by the matching unit 149 and performs displaying and processing of a fingerprint authentication success. If the matching score is less than of equal to the threshold value, the CPU 112 determines as a fingerprint authentication failure and performs displaying and processing of a fingerprint authentication failure.

As described above, the biometric image processing apparatus 101 expands or contracts the fingerprint image generated by the slide-type fingerprint sensor 132 using the proper expansion or contraction rate, and matches the feature information of the fingerprint image after the expansion or contraction with the feature information of the fingerprint image generated by the surface-type fingerprint sensor 122 so as to make it possible to improve authentication precision.

In this regard, in the above, a description has been given of an example in which the fingerprint sensor 122 is a surface-type fingerprint sensor, and the fingerprint sensor 132 is a slide-type fingerprint sensor. However, the present disclosure is not limited to this. The fingerprint sensor 122 may be a slide-type fingerprint sensor, and the fingerprint sensor 132 may be a surface-type fingerprint sensor. In that case, the biometric image processing apparatus 101 performs the registration processing in FIG. 2 on the fingerprint image generated by the slide-type fingerprint sensor 122 and performs the matching processing in FIG. 3 on the fingerprint image generated by the surface-type fingerprint sensor 132. The biometric image processing apparatus 101 expands or contracts the fingerprint image generated by the surface-type fingerprint sensor 132 using the proper expansion or contraction rate and matches the feature information of the fingerprint image after the expansion or contraction with the feature information of the fingerprint image by the slide-type fingerprint sensor 122 so as to make it possible to improve authentication precision.

Here, a method is considered in which the biometric image processing apparatus 101 registers the feature information of a plurality of fingerprint images produced by expanding or contracting the fingerprint image generated by the fingerprint sensor 122 in the external storage device 115. However, this results in an increase of the amount of the feature information registered in the external storage device 115, and increases the feature information to be matched against by the CPU 112 for one identifier, and thus a problem of taking a long matching time arises. With the present embodiment, it is possible to reduce the capacity of the registration feature information to be registered in the external storage device 115 and to reduce the matching time by the CPU 112.

Also, a method is considered in which the biometric image processing apparatus 101 generates a large number of expanded or contracted image groups in step S304, does not calculate the proper expansion rate in step S306, and performs matching the feature information of the large number of expanded or contracted image groups with the registration feature information 150. However, since there are a large number of expanded or contracted image groups, there is a problem in that the matching time by the CPU 112 becomes long. With the present embodiment, as illustrated in FIG. 8, the biometric image processing apparatus 101 estimates the proper expansion rate that provides the maximum similarity Sim(sc) based on the similarities Sim(sc) of a small number of expanded or contracted image groups, expands or contracts the fingerprint images by the proper expansion rate, and matches the feature information of the fingerprint image after the expansion or contraction with the registration feature information 150. Since the number of the expanded or contracted image groups is small, it is possible shorten the matching time by the CPU 112.

Also, it is possible for the biometric image processing apparatus 101 to maintain the compatibility between the different fingerprint sensors. As a result, it is possible for a user to use various kinds of fingerprint sensors depending on applications, and thus the convenience is improved.

Second Embodiment

Figure 9:
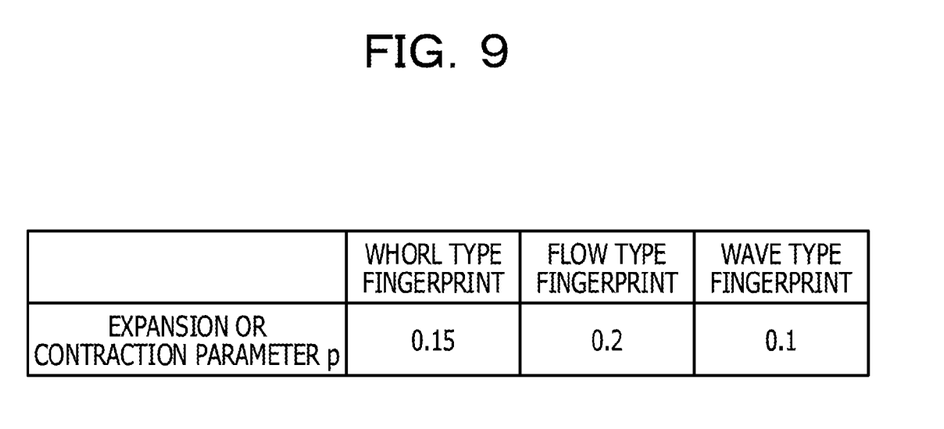
FIG. 9 is a diagram illustrating an example of the table of expansion or contraction parameters used by a biometric image processing apparatus according to a second embodiment.

FIG. 9 is a diagram illustrating an example of the table of expansion or contraction parameters used by the biometric image processing apparatus 101 according to a second embodiment. In the following, a description will be given of different points of the present embodiment from those of the first embodiment. The types of fingerprints are classified into any one of the whorl type fingerprint in FIG. 4A, the flow type fingerprint in FIG. 4B, and the wave type fingerprint in FIG. 4C. As illustrated in FIG. 9, the biometric image processing apparatus 101 generates a table indicating a relationship among the types of a fingerprint and an expansion or contraction parameter p. For example, the biometric image processing apparatus 101 calculates respective expansion or contraction parameters p of a plurality of fingerprint images that belong to each type of the fingerprints provided in advance using a method according to the first embodiment, obtains the average value of the expansion or contraction parameters p calculated for each type of the fingerprint so as to generate a table in FIG. 9, and stores the average values in the external storage device 115.

In step S303 in FIG. 3, the CPU 112 determines the type of the fingerprint of the fingerprint image obtained in step S301, refers to the table in FIG. 9, and determines the expansion or contraction parameter p depending on the type of the fingerprint. The types of a fingerprint are, for example, the whorl type fingerprint in FIG. 4A, the flow type fingerprint in FIG. 4B, and the wave type fingerprint in FIG. 4C. The CPU 112 searches, for example, for a fingerprint type having the highest correlation coefficient with the fingerprint images of each fingerprint type provided in advance among the fingerprint images obtained in step S301, or searches for a fingerprint type having the closest distribution of the direction vectors of the ridges in the fingerprint image obtained in step S301 so as to determine the type of the fingerprint. After that, the biometric image processing apparatus 101 performs the same processing as that of the first embodiment.

With the present embodiment, it is possible for the biometric image processing apparatus 101 to obtain the expansion or contraction parameter p only by roughly determining the fingerprint type using the table in FIG. 9, in which typical fingerprint types and the expansion or contraction parameters p are associated. As a result, even if the quality of a fingerprint image is poor, or part of a ridge or a minutia is obscure, it is possible for the biometric image processing apparatus 101 to calculate the expansion or contraction parameter p at low cost and to expand or contract the fingerprint image in the vertical direction using the proper expansion rate.

It is possible to realize the present embodiment by causing a computer to execute a program. Also, it is possible to apply a computer-readable recording medium on which the above-described program is recorded and a computer program product, such as the above-described program, or the like as embodiments the present disclosure. As the recording medium it is possible to use, for example, a flexible disk, a hard disk, an optical disc, a magneto-optical disk, a CD-ROM, a magnetic tape, a nonvolatile memory card, a ROM, or the like.

In this regard, all of the above-described embodiments are only specific examples for carrying out the present disclosure, and the spirit and scope of the present disclosure is not interpreted in a limiting sense by these. That is to say, it is possible to carry out the present disclosure in various forms without departing from the spirit and scope thereof or the main features thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory configured to store first information of a first fingerprint image; and
   a processor coupled to the memory and configured to:
   obtain second information of a second fingerprint image;
   generate third information of a third fingerprint image by enlarging or reducing the second fingerprint image;
   specify an enlargement rate or a reduction rate based on a first similarity between the second information and the first information and a second similarity between the third information and the first information; and
   execute a first matching process of the first information and fourth information of a fourth fingerprint image, the fourth fingerprint image being generated by enlarging or reducing the first fingerprint image by the specified enlargement rate or the reduction rate.

2. The information processing apparatus according to claim 1, wherein
   the processor is further configured to specify the enlargement rate or the reduction rate so that a third similarity between the fourth information and the first information is higher than the first similarity and higher than the second similarity.

3. The information processing apparatus according to claim 1, wherein
   the processor is further configured to:
   specify a degree of change between the second information and fifth information of a fifth fingerprint image generated by shifting the second fingerprint image; and
   specify the enlargement rate or the reduction rate in accordance with the degree of change.

4. The information processing apparatus according to claim 1, wherein
   the processor is further configured to:
   determine a fingerprint type of the second fingerprint image; and
   specify the enlargement rate or the reduction rate in accordance with the fingerprint type.

5. The information processing apparatus according to claim 1, wherein
   the processor is further configured to:
   specify the enlargement rate or the reduction rate based on a fourth similarity between second feature information of the second fingerprint image and first feature information of the first fingerprint image and a fifth similarity between third feature information of the third fingerprint image and the first feature information; and
   execute a second matching process of the third feature information and the first feature information.

6. The information processing apparatus according to claim 1, wherein
   the processor is further configured to:
   generate an enlarged image by enlarging the second fingerprint image and a reduced image by reducing the second fingerprint image; and
   specify the enlargement rate or the reduction rate based on the first similarity, a sixth similarity between sixth information of the enlarged image and the first information, and a seventh similarity between seventh information of the reduced image and the first information.

7. The information processing apparatus according to claim 1, wherein
   the second fingerprint image is generated by a first fingerprint sensor,
   the processor is further configured to:
   determine whether a type of the first fingerprint sensor is identical to a type of a second fingerprint sensor;
   when the type of the first fingerprint sensor is not identical to the type of the second fingerprint sensor, execute the first matching process; and
   when the type of the first fingerprint sensor is identical to the type of the second fingerprint sensor, execute a third matching process of the second information image and the first information.

8. The information processing apparatus according to claim 7, wherein
   the processor is further configured to:
   when both of the first fingerprint sensor and the second fingerprint sensor are fingerprint sensors which are slid against a fingerprint, determine that the type of the first fingerprint sensor is identical to the type of the second fingerprint sensor, and
   when both of the first fingerprint sensor and the second fingerprint sensor are fingerprint sensors which are not slid against the fingerprint, determine that the type of the first fingerprint sensor is identical to the type of the second fingerprint sensor.

9. The information processing apparatus according to claim 7, wherein
   the processor is further configured to:
   cause the memory to store information indicating the type of the second fingerprint sensor; and
   obtain information indicating the type of the first fingerprint sensor.

10. A method comprising:
    obtaining first information of a first fingerprint image;
    obtaining second information of a second fingerprint image;
    generating third information of a third fingerprint image by enlarging or reducing the second fingerprint image;
    specifying an enlargement rate or a reduction rate based on a first similarity between the second information and the first information and a second similarity between the third information and the first information; and
    executing a first matching process of the first information and fourth information of a fourth fingerprint image, the fourth fingerprint image being generated by enlarging or reducing the first fingerprint image by the enlargement rate or the reduction rate.

11. The method according to claim 10, further comprising:
    specifying the enlargement rate or the reduction rate so that a third similarity between the fourth information and the first information is higher than the first similarity and higher than the second similarity.

12. The method according to claim 10, further comprising:
    specifying a degree of change between the second information and fifth information of a fifth fingerprint image generated by shifting the second fingerprint image; and
    specifying the enlargement rate or the reduction rate in accordance with the degree of change.

13. The method according to claim 10, further comprising:

determining a fingerprint type of the second fingerprint image; and specifying the enlargement rate or the reduction rate in accordance with the fingerprint type.

14. The method according to claim 10, further comprising:

specify the enlargement rate or the reduction rate based on a fourth similarity between second feature information of the second fingerprint image and first feature information of the first fingerprint image and a fifth similarity between third feature information of the third fingerprint image and the first feature information; and execute a second matching process of the third feature information and the first feature information.

15. The method according to claim 10, further comprising:

generating an enlarged image by extending the second information and a reduced image by reducing the second information; and specifying the enlargement rate or the reduction rate based on the first similarity, a sixth similarity of sixth information of the enlarged image to the first information, and a seventh similarity between seventh information of the reduced image and the first information.

16. A non-transitory computer-readable storage medium storing a program that causes an information processing apparatus to execute a process, the process comprising:

obtaining first information of a first fingerprint image;

obtaining second information of a second fingerprint image;

generating third information of a third fingerprint image by enlarging or reducing the second fingerprint image;

specifying an enlargement rate or a reduction rate based on a first similarity between the second information and the first information and a second similarity between the third information and the first information; and executing a first matching process of the first information and fourth information of a fourth fingerprint image, the fourth fingerprint image being generated by enlarging or reducing the first information fingerprint image by the enlargement rate or the reduction rate.

17. The non-transitory computer-readable storage medium according to claim 16, the process further comprising:

specifying the enlargement rate or the reduction rate so that a third similarity between the fourth information and the first information is higher than the first similarity and higher than the second similarity.

18. The non-transitory computer-readable storage medium according to claim 16, the process further comprising:

specifying a degree of change between the second information image and fifth information of a fifth fingerprint image generated by shifting the second fingerprint image; and specifying the enlargement rate or the reduction rate in accordance with the degree of change.

19. The non-transitory computer-readable storage medium according to claim 16, the process further comprising:

determining a fingerprint type of the second fingerprint image; and specifying the enlargement rate or the reduction rate in accordance with the fingerprint type.

20. The non-transitory computer-readable storage medium according to claim 16, the process further comprising:

specify the enlargement rate or the reduction rate based on a fourth similarity between second feature information of the second fingerprint image and first feature information of the first fingerprint image and a fifth similarity between third feature information of the third fingerprint image and the first feature information; and execute a second matching process of the third feature information and the first feature information.

\* \* \* \* \*